(12) United States Patent
Kang et al.

(10) Patent No.: US 7,820,735 B2
(45) Date of Patent: *Oct. 26, 2010

(54) INK COMPOSITION FOR A COLOR FILTER, A COLOR FILTER SUBSTRATE MANUFACTURED USING THE INK COMPOSITION AND METHOD OF MANUFACTURING A COLOR FILTER SUBSTRATE USING THE INK COMPOSITION

(75) Inventors: Yoon-Ho Kang, Yongin-si (KR);
Byoung-Joo Kim, Anyang-si (KR);
Jang-Sub Kim, Suwon-si (KR);
Seong-Gyu Kwon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 987 days.

This patent is subject to a terminal disclaimer.

(21) Appl. No.: 11/283,025

(22) Filed: Nov. 18, 2005

(65) Prior Publication Data
US 2006/0128832 A1    Jun. 15, 2006

(30) Foreign Application Priority Data
Dec. 10, 2004  (KR) ................. 10-2004-0104222

(51) Int. Cl.
| | |
|---|---|
| *B05D 5/00* | (2006.01) |
| *B05D 5/12* | (2006.01) |
| *B41J 2/01* | (2006.01) |
| *C04B 35/634* | (2006.01) |
| *C08C 19/00* | (2006.01) |
| *C08F 8/12* | (2006.01) |
| *C08F 8/18* | (2006.01) |
| *C08F 8/26* | (2006.01) |
| *C08F 8/28* | (2006.01) |
| *C08F 24/00* | (2006.01) |
| *C08F 16/02* | (2006.01) |
| *C08F 20/32* | (2006.01) |
| *C08F 116/02* | (2006.01) |
| *C08F 216/02* | (2006.01) |
| *C08F 220/32* | (2006.01) |
| *C08F 222/40* | (2006.01) |
| *C08F 283/06* | (2006.01) |
| *C08G 59/50* | (2006.01) |
| *C08G 65/32* | (2006.01) |
| *C08L 27/12* | (2006.01) |
| *C08L 31/00* | (2006.01) |
| *C08L 33/06* | (2006.01) |
| *C08L 37/00* | (2006.01) |
| *C08L 39/00* | (2006.01) |
| *C08L 63/00* | (2006.01) |
| *C08L 71/02* | (2006.01) |
| *C09B 67/00* | (2006.01) |
| *C09D 5/00* | (2006.01) |
| *C09D 5/02* | (2006.01) |
| *C09D 11/00* | (2006.01) |
| *D06M 15/277* | (2006.01) |
| *G01D 11/00* | (2006.01) |

(52) U.S. Cl. .................. 523/160; 347/1; 347/100; 427/58; 427/68; 427/108; 427/110; 427/256; 523/161; 523/400; 525/107; 525/326.4; 525/327.3; 525/328.8; 525/383; 525/385; 525/403; 525/404; 524/544; 524/548; 524/556; 524/560; 524/561

(58) Field of Classification Search .......... 523/160, 523/161, 400; 525/107, 326.4, 327.3, 328.8, 525/383, 385, 403, 404; 427/58, 68, 108, 427/110, 256; 524/544, 548, 556, 560, 561; 347/1, 100

See application file for complete search history.

(56) References Cited

U.S. PATENT DOCUMENTS

| 6,087,010 | A | 7/2000 | Yoshida et al. ......... 428/421 |
|---|---|---|---|
| 7,604,921 | B2 * | 10/2009 | Kang et al. ............ 430/286.1 |
| 2004/0260075 | A1 | 12/2004 | Araki .................. 534/839 |
| 2005/0042530 | A1 * | 2/2005 | Kato et al. ................ 430/7 |

FOREIGN PATENT DOCUMENTS

| JP | 2002-318309 | 10/2002 |
|---|---|---|
| JP | 2002-318380 | 10/2002 |

* cited by examiner

*Primary Examiner*—Patrick D Niland
(74) *Attorney, Agent, or Firm*—F. Chau & Associates, LLC

(57) ABSTRACT

An ink composition for a color filter includes about 100 parts by weight of a pigment dispersion, about 7 parts by weight to about 65 parts by weight of a thermosetting resin having hydroxyl group at a side chain of the thermosetting resin, about 0.015 part by weight to about 1.5 parts by weight of a thermal initiator, about 0.8 part by weight to about 15 parts by weight of an epoxy-based resin containing fluorine, and about 15 parts by weight to about 165 parts by weight of a solvent. A color filter substrate is manufactured using the ink composition for color filter. The ink composition for the color filter improves straightness of ink jetting through an ink-jetting nozzle and prevents the ink composition from spreading to neighboring pixels.

14 Claims, 9 Drawing Sheets

A B

INK COMPOSITION FOR A COLOR FILTER, A COLOR FILTER SUBSTRATE MANUFACTURED USING THE INK COMPOSITION AND METHOD OF MANUFACTURING A COLOR FILTER SUBSTRATE USING THE INK COMPOSITION

CROSS-REFERENCE TO RELATED APPLICATION

This application relies for priority upon Korean Patent Application No. 2004-104222 filed on Dec. 10, 2004, the contents of which are herein incorporated by reference in its entirety.

BACKGROUND OF THE INVENTION

1. Field of the Invention

The present invention relates to an ink composition for a color filter, a color filter substrate manufactured using the ink composition, a method of manufacturing a color filter substrate using the ink composition. More particularly, the present invention relates to an ink composition for a color filter capable of preventing an ink bleed at a surface of an ink-jetting nozzle and a surface of a black matrix of a color filter substrate. In addition the present invention relates to color filter substrates having improved thermal endurance and chemical resistance over conventional color filter substrates, as well as to methods of manufacturing a color filter substrate using the ink composition.

2. Description of the Related Art

Electric display devices are becoming more important as a visual information transmission media, as evidenced by their wide application in various industries. Novel electric display devices having novel functions that correspond to the demands of the information society are continually being developed.

In general, an electric display device converts electric information into an image. The electric display device is classified as either an emissive display device displaying an image using a light emission, or a non-emissive display device displaying the image using optical properties such as a reflection, a scattering, an interference, etc. The emissive display device may be referred to as an "active display device". Examples of emissive display devices include a cathode ray tube (CRT), a plasma display panel (PDP), a light emitting diode (LED), an electroluminescent display (ELD), etc. Examples of non-emissive display devices as a positive display device include a liquid crystal display (LCD) device, an electrophoretic image display (EPID), etc.

The CRT, is one of the conventional display apparatuses used in image display instruments such as a television set, a computer, etc., and is widely used due to its display quality and low price. However, there are certain downsides to the CRT such as for example, it's heavy weight, large size, high power consumption, etc.

Therefore, electric display devices that are small in size and lightweight are highly desirable. Due to advances in semiconductor technology display devices including a flat typed panel that have characteristics such as thin thickness, low driving voltage, low power consumption, etc., are currently available and in high demand.

The LCD is a highly popular flat display device. The LCD device is thinner, has lower driving voltage and lower power consumption as compared to the CRT. Moreover, the LCD device also has an image display quality substantially the same as the CRT. The LCD device can also be easily manufactured, to thereby expand its applications in various areas.

The LCD device includes color filters such as a red color filter, a green color filter, a blue color filter, etc., to express a color image.

In order to manufacture a color filter, various processes have been applied to replace conventional photo lithography processes. One such process, is an ink jetting process employed to manufacture the color filter. According to the ink jetting process, a light-blocking layer such as a black matrix is formed on a glass substrate, and then the light-blocking layer undergoes an exposing process, a developing process to form a pixel area on the blocking layer, and ink is then injected into a pixel area to form the color filter. In addition, with the ink jetting process, additional processes such as a coating process, an exposing process, a developing process, etc., are not required to form the color filter, thereby the ink jetting process provides a simpler, less costly process, requiring less materials than other color filter manufacturing processes.

Further, with the ink jetting method, a color layer should be uniformly formed on each of the pixels so as to have a great color property. However, when ink overflows from a pixel on a color filter substrate, the ink is spread to the black matrix and neighboring pixels to contaminate neighboring pixels on the color filter substrate. Moreover, when the ink is jetted from an ink-jetting nozzle, the performance of the ink-jetting process mainly depends on a relationship between the ink and the ink-jetting nozzle. In particular, in the case where the ink is largely wetted to the surface of the ink-jetting nozzle, the jetting of the ink may not be straight or the ink cannot be jetted from the ink-jetting nozzle.

Thus, it is desirable to have an ink composition for a color filter capable of preventing an ink bleed when manufacturing a color filter substrate and which also improves the straightness of the jetting of the ink through an ink-jetting nozzle.

SUMMARY OF THE INVENTION

Exemplary embodiments of the present invention provide an ink composition for a color filter capable of preventing an ink bleed when manufacturing a color filter substrate and improving straightness of ink jetting of an ink-jetting nozzle when jetting the ink composition.

Further, exemplary embodiments of the present invention also provide a color filter substrate manufactured using the above ink composition, and the color filter substrate has a great thermal endurance and a great chemical resistance.

Moreover, exemplary embodiments of he present invention further provide a method of manufacturing a color filter substrate using the above ink composition.

In accordance with an exemplary embodiment of the present invention, there is provided an ink composition for a color filter. The ink composition includes about 100 parts by weight of a pigment dispersion, about 7 parts by weight to about 65 parts by weight of a thermosetting resin, about 0.015 part by weight to about 1.5 parts by weight of a thermal initiator, about 0.8 part by weight to about 15 parts by weight of an epoxy-based resin, and about 15 parts by weight to about 165 parts by weight of a solvent. The thermosetting resin has a hydroxyl group at a side chain of the thermosetting resin. The epoxy-based monomer contains fluorine.

In accordance with another exemplary embodiment of the present invention, there is provided a color filter substrate. The color filter substrate includes a substrate, a light blocking layer and a color filter layer. The light blocking layer is formed on the substrate to block a light transmitted through the substrate, and the light blocking layer forms a pixel area on the substrate. The color pixel layer is formed in the pixel area, and the color pixel layer expresses an original color in response to the light. The color pixel layer includes a cross-linked resin formed through a cross-linking reaction between a thermosetting resin having hydroxyl group at a side chain of the thermosetting resin and an epoxy-based monomer containing fluorine.

In accordance with still another exemplary embodiment of the present invention, there is provided a method of manufacturing a color filter substrate. According to the method of manufacturing a color filter substrate, a blocking layer is formed on a substrate, and the blocking layer blocks a light transmitted through the substrate and defines a pixel area. An ink composition for a color filter is jetted into the pixel area. The ink composition for color filter includes about 100 parts by weight of a pigment dispersion, about 7 parts by weight to about 65 parts by weight of a thermosetting resin having hydroxyl group at a side chain of the thermosetting resin, about 0.015 part by weight to about 1.5 parts by weight of a thermal initiator, about 0.8 part by weight to about 15 parts by weight of an epoxy-based resin containing fluorine, and about 15 parts by weight to about 165 parts by weight of a solvent. The ink composition is heated to generate an acid from the thermal initiator. The ink composition is reheated to form a cross-linked resin. The cross-linked resin is formed through a cross-linking reaction between the thermosetting resin and the epoxy-based monomer.

According to at least one exemplary embodiment of the present invention, when the color filter substrate is manufactured, the ink composition for the color filter improves straightness of ink jetting through an ink-jetting nozzle that moves and jets the ink composition into a pixel area. Also, the ink composition prevents the ink composition from spreading to neighboring pixels.

BRIEF DESCRIPTION OF THE DRAWINGS

The present invention will become more readily apparent to those skilled in the art when descriptions of exemplary embodiments thereof are read with reference to the accompanying drawings wherein.

DETAILED DESCRIPTION OF EXEMPLARY EMBODIMENTS

Figure 1:
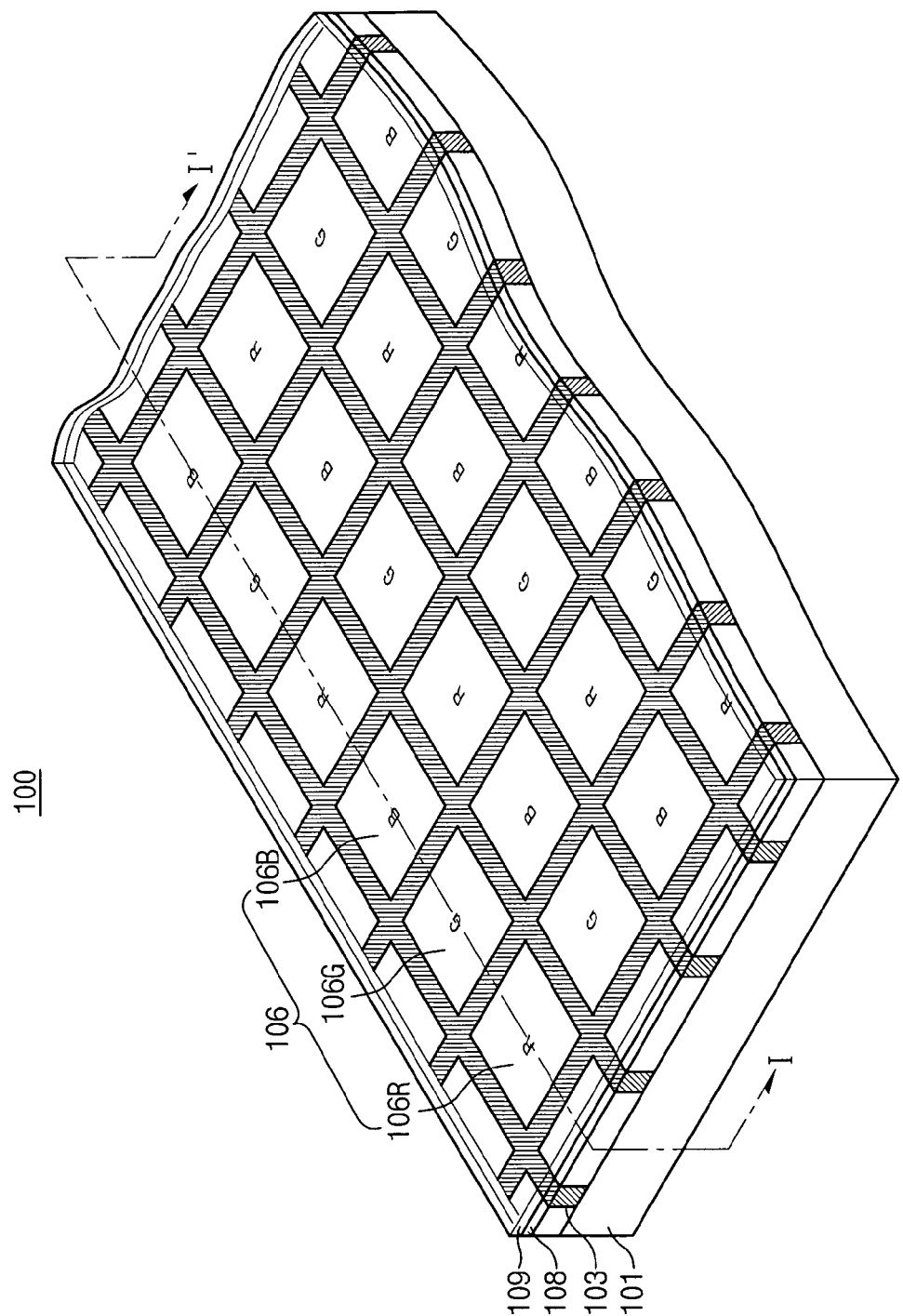
FIG. 1 is a perspective view illustrating a color filter substrate in accordance with an exemplary embodiment of the present invention.

Hereinafter, the exemplary embodiments of the present invention will be described in detail with reference to accompanying drawings.

Ink Composition for Color Filter

An ink composition for color filter includes a pigment dispersion, a thermosetting resin, a thermal initiator, an epoxy-based monomer and a solvent.

The pigment dispersion includes a pigment, a solvent, a dispersing agent, etc. The pigment dispersion is prepared by mixing the above components. An ink used for a manufacturing a color filter by an ink jetting process, is used in the present invention.

The thermosetting resin includes a copolymer having a hydroxyl group at a side chain of the thermosetting resin. Examples of the copolymer may include but are not limited to an acryl-based copolymer polymerized from monomers such as glycidylmethacrylate, benzylmethacrylate,2-hydroxyethylmethacrylate, methylmethacrylate, etc. The acryl-based copolymer has the hydroxyl group at a side chain of the acryl-based copolymer. In addition, the copolymer may include but is not limited to an acryl-based copolymer of formula (1) or an acryl-based copolymer of formula (2):

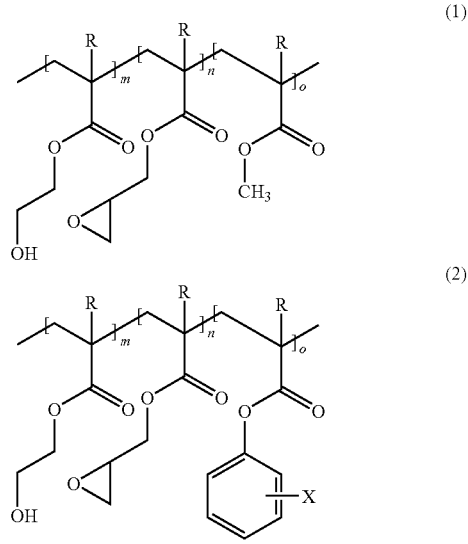

wherein 'R' denotes hydrogen or a methyl group, 'X' denotes hydrogen, an alkyl group, a nitro group or an alkoxy group, and 'm' denotes an integer of 1 to 1000, and each of 'o' and 'n' denotes integer of 0 to 1000.

The acryl-based copolymers represented by formulae (1) and (2) may be used alone or in a mixture thereof.

When a content of the thermosetting resin is less than about 7 parts by weight based on about 100 parts by weight of the pigment dispersion, strength, thermal endurance and chemical resistance of a coated layer are deteriorated, and adherent force of the ink on a substrate is also deteriorated. When the content of the thermosetting resin exceeds about 65 parts by weight based on about 100 parts by weight of the pigment dispersion, viscosity of the ink increases, and thus fluidity of the ink decreases. Therefore, the ink is difficult to be uniformly jetted from an ink-jetting nozzle, so that the ink may not be jetted in a direction substantially in parallel with a moving direction of the ink-jetting nozzle. Therefore, the content of the thermosetting resin is in a range of about 7 parts by weight to about 65 parts by weight based on about 100 parts by weight of the pigment dispersion. The content of the thermosetting resin is preferably in a range of about 15 parts by weight to about 40 parts by weight based on about 100 parts by weight of the pigment dispersion.

The thermosetting resin preferably includes a copolymer polymerized at random from monomers including glycidylmethacrylate, benzylmethacrylate, 2-hydroxyethylmethacrylate and methylmethacrylate of about 30:30:30:10. The copolymer has a weight average molecular weight of about 15000.

Examples of the thermal initiator may include but are not limited to (2-cyclohexanonyl)cyclohexyl methylsulfonium trifluoromethanesulfonate, (2-cyclohexanonyl)dimethylsulfonium trifluoromethanesulfonate, (2-cyclohexanonyl)2-norbornanyl methylsulfonium trifluoromethanesulfonate, triphenylsulfonium perfluorooctansulfonate, s-(2-naphthalenecarbonylmethyl)tetrahydrothiophenium p-toluenesulfonate, di-(4-t-butylbenzen)iodonium hexafluorophosphorate di-(4-t-butylbenzen)iodonium hexafluoroantimonate and di-(4-t-butylbenzen)iodonium nonafluorobuthanesulfonate. These can be used alone or in a mixture thereof.

The thermal initiator generates an acid at a temperature higher than about 140° C. When a content of the thermal initiator is less than about 0.015 part by weight, the acid may not be generated, so that a cross-linking reaction between the thermosetting resin and the epoxy-based monomer is difficult to be generated. Although the content of the thermal initiator exceeds about 1.5 parts by weight, reaction efficiency is constant. Therefore, the content of the thermal initiator is in a range of about 0.015 part by weight to about 1.5 parts by weight. The content of the thermal initiator is preferably in a range of about 0.15 part by weight to about 0.9 part by weight.

The epoxy-based monomer may include but is not limited to compounds of formulae (3) and (4), and these can be used alone or in mixture thereof:

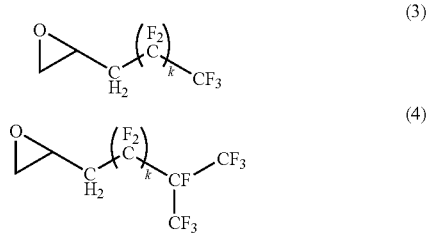

wherein 'n' denotes an integer of 1 to 20.

An epoxy-group of the epoxy-based monomer is opened through an opening reaction performed at a temperature of more than about 200° C. in an acidic state.

When a content of the epoxy-based monomer is less than about 0.8 part by weight based on about 100 parts by weight of the pigment dispersion, a degree of cure and a degree of residual layer are deteriorated after forming an ink pattern, and a color filter layer may not be acquired. When the content of the epoxy-based monomer exceeds about 15 parts by weight based on about 100 parts by weight of the pigment dispersion, viscosity of the ink increases and thus fluidity of the ink decreases. Therefore, the content of the epoxy-based monomer is in a range of about 0.8 part by weight to about 15 parts by weight based on about 100 parts by weight of the pigment dispersion, and the content of the epoxy-based monomer is preferably in a range of about 1.5 parts by weight to about 9 parts by weight based on about 100 parts by weight of the pigment dispersion.

The epoxy-based monomer contains fluorine, so that a contact angle of the ink remarkably increases. Therefore, the ink composition is easily separated from the ink-jetting nozzle when jetting the ink composition, so that the ink composition remained at the ink-jetting nozzle may not influence a subsequent ink-jetting process.

Examples of the solvent may include but are not limited to a propyleneglycol monomethylether acetate, ethylethoxy propionate, cyclohexanon, dipropyleneglycol ether acetate, etc. These can be used alone or in a mixture thereof. When a content of the solvent is less than about 15 parts by weight based on about 100 parts by weight of the pigment dispersion, the ink may not be uniformly jetted from the ink-jetting nozzle. When the content of the solvent exceeds about 165 parts by weight based on about 100 parts by weight, degree of residual layer is deteriorated after forming a color filter layer, so that a color filter substrate having great color purity may be not difficult to manufacture. Therefore, the content of the solvent is in a range of about 15 parts by weight to about 165 parts by weight. The content of the solvent is preferably in a range of about 30 parts by weight to about 120 parts by weight.

The ink composition for a color filter may further include an additive so as to improve physical and chemical properties of the ink composition for color filter. The additives used in a normal process of manufacturing the color filter substrate are available in the present invention. The additive may include but is not limited to an antifoaming agent, a surface leveling agent, etc. The antifoaming agent prevents a generation of a bubble in the ink composition. The surface leveling agent improves a leveling of the ink composition. The additives can be used alone or in a mixture thereof. A content of the additives is in a range of about 0.015 part by weight to about 3 parts by weight.

Color Filter Substrate

Figure 2:
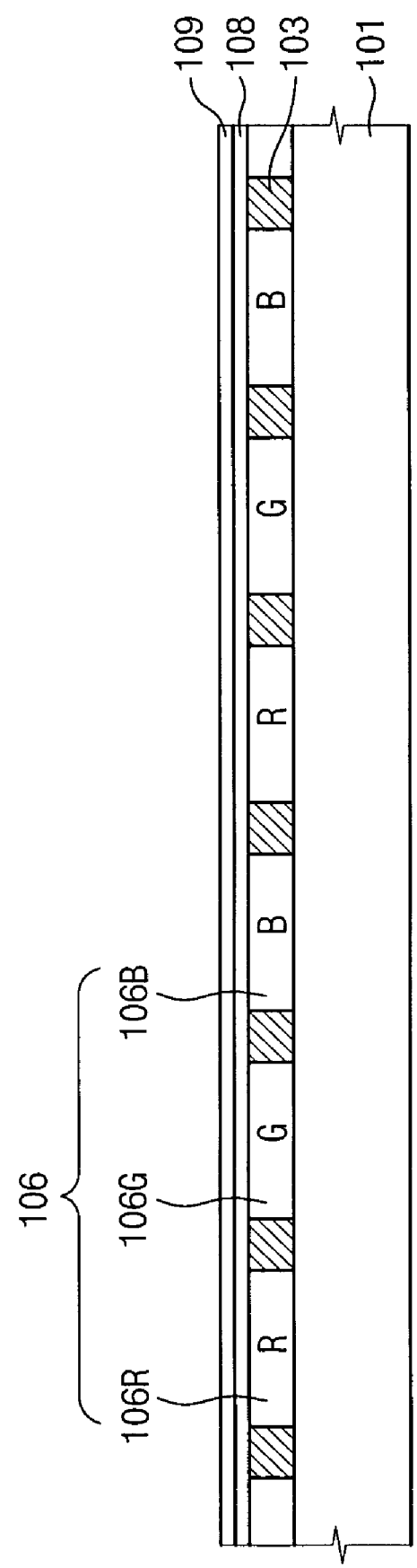
FIG. 2 is a cross-sectional view taken along a line I-I' in FIG. 1.

FIG. 1 is a perspective view illustrating a color filter substrate in accordance with an exemplary embodiment of the present invention. FIG. 2 is a cross-sectional view taken along a line I-I' in FIG. 1.

Referring to FIGS. 1 and 2, a color filter substrate 100 includes a substrate 101, a black matrix (a light blocking layer) 103, a color pixel layer 106, a protecting layer 108 and a common electrode layer 109.

The light blocking layer 103 includes an organic polymer, and the light blocking layer 103 is formed by a positive typed photoresist that is soluble in a developing agent at a portion to which a light is irradiated. The light blocking layer 103 forms a pixel area on the substrate 101. The light blocking layer 103 is upwardly positioned with respect to the substrate 101 to prevent a color-interference between the pixel areas adjacent each other.

The light blocking layer 103 has various shapes such as a honeycomb shape, a stripe shape, etc.

The color pixel layer 106 is formed in the pixel area defined by the black matrix 103, and expresses an original color in response to a light. The color pixel layer 106 includes a red color pixel 106R, a green color pixel 106G and a blue color pixel 106B.

The protecting layer 108 is formed on the color pixel layer 106 to protect the color pixel layer 106 from a heat generated when the light is irradiated to the color pixel layer 106. The protecting layer 108 also planarizes the color pixel layer 106.

The common electrode layer 109 is formed on the protecting layer 108. The common electrode layer 109 includes transparent and conductive material such as indium tin oxide (ITO), indium zinc oxide (IZO), etc. The common electrode layer 109 receives a power voltage from an exterior.

The ink composition for the color filter in accordance with at least one exemplary embodiment of the present invention is jetted into the pixel area and cured to form the color pixel layer 106, thereby preventing the ink composition from being mixed and dispersed between the pixel areas adjacent to each other.

The ink composition for the color filter includes about 100 parts by weight of pigment dispersion, about 7 parts by weight to about 65 parts by weight of a thermosetting resin, about 0.015 part by weight to about 1.5 parts by weight of a thermal initiator, about 0.8 part by weight to about 15 parts by weight of an epoxy-based monomer, about 15 parts by weight to about 165 parts by weight of a solvent and about 0.015 part by weight to about 3 parts by weight of an additive. The thermosetting resin contains a hydroxyl group at a side chain of the thermosetting resin. The epoxy-based monomer contains fluorine. The ink composition for color filter is already described in detail and thus further description of the ink composition for color filter will be omitted hereinafter.

The color pixel layer 106 includes a cross-linked resin formed by a cross-link reaction between the thermosetting resin and the epoxy-based monomer. The thermosetting resin includes a copolymer containing the hydroxyl group. The copolymer includes an acryl-based copolymer polymerized from monomers such as glycidylmethacrylate, benzylmethacrylate, 2-hydroxyethylmethacrylate, methylmethacrylate, etc. The acryl-based copolymer has the hydroxyl group at a side chain of the acryl-based copolymer. In addition, the copolymer may include an acryl-based copolymer of formula (1) or an acryl-based copolymer of formula (2):

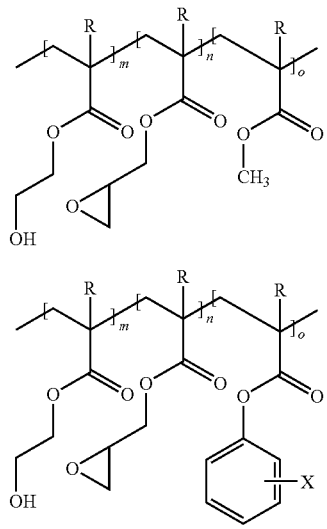

wherein 'R' denotes hydrogen or a methyl group, 'X' denotes hydrogen, an alkyl group, a nitro group or an alkoxy group, and 'm' denotes an integer of 1 to 1000, and each of 'o' and 'n' denotes integer of 0 to 1000.

The epoxy-based monomer may include compounds of formulae (3) and (4), these can be used alone or mixture thereof:

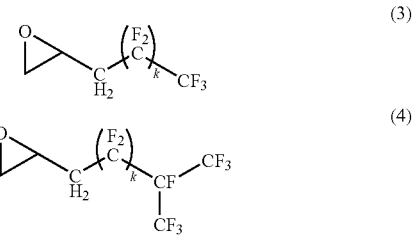

wherein 'n' denotes an integer of 1 to 20.

The cross-linked resin may be formed by a cross-link reaction between a plurality of the thermosetting resins and a plurality of the epoxy-based monomers, and various combinations may be available between the thermosetting resins and the epoxy-based monomers. Alternatively, the cross-linked resin may be formed by cross-link between one of the thermosetting resins and a plurality of the epoxy-based monomers.

Examples of the cross-linked resins may include but are not limited to resins represented by formulae (7) and (8):

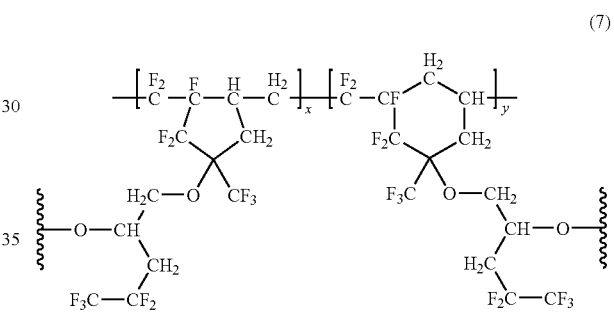

wherein 'X' denotes an integer of 1000 to 10000 and 'Y' denotes an integer of 1000 to 10000;

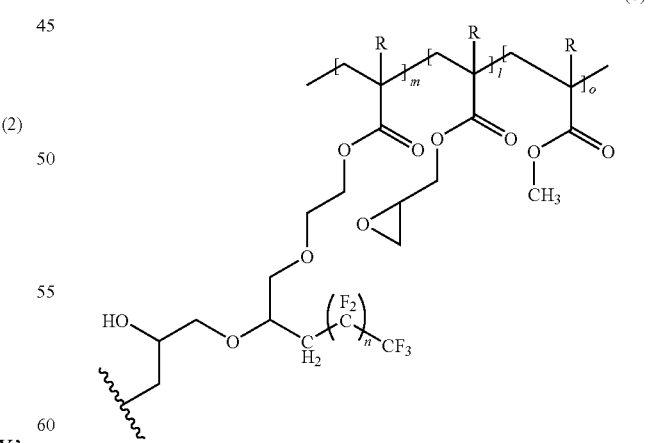

wherein 'R' denotes hydrogen or a methyl group, 'X' denotes hydrogen, an alkyl group, a nitro group or an alkoxy group, each of 'm', 'l' and 'o' denotes an integer of 0 to 1000, (the values 'm', 'n' and 'o' cannot be zero at the same time) and 'n' denotes an integer of 1 to 20.

The cross-linked resin in accordance with at least one exemplary embodiment of the present invention forms a cross-linkage as the above, so that the color pixel layer 106 of the color filter substrate 100 has great thermal endurance and chemical resistance.

Method of Manufacturing a Color Filter Substrate

Figure 3A:
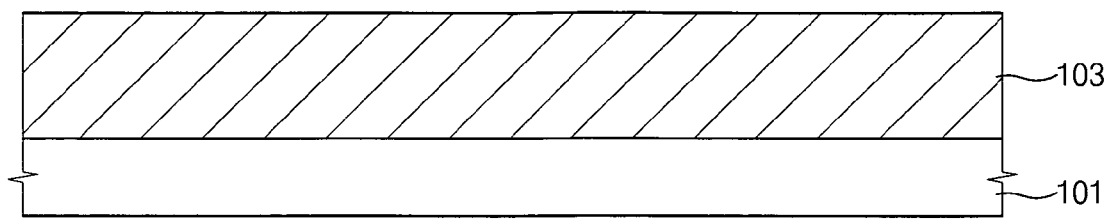
FIGS. 3A to 3C are cross-sectional views illustrating a method of forming a black matrix pattern in accordance with an exemplary embodiment of the present invention.
Figure 3B:
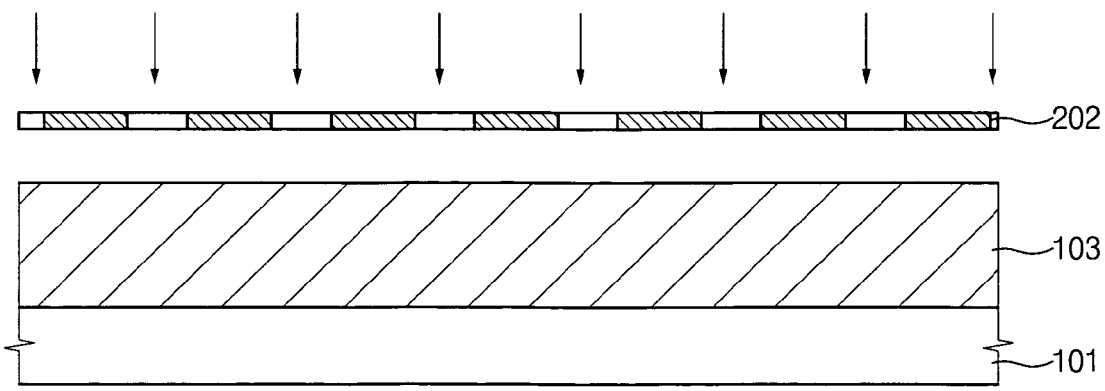
Figure 3C:
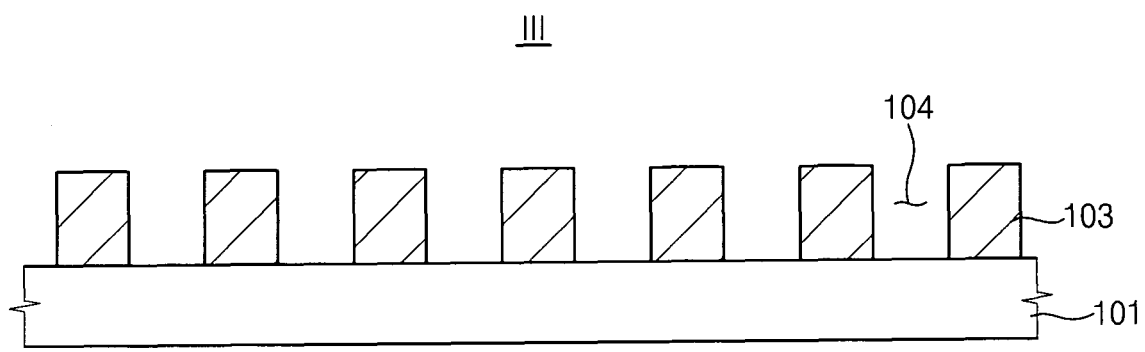
Figure 4:
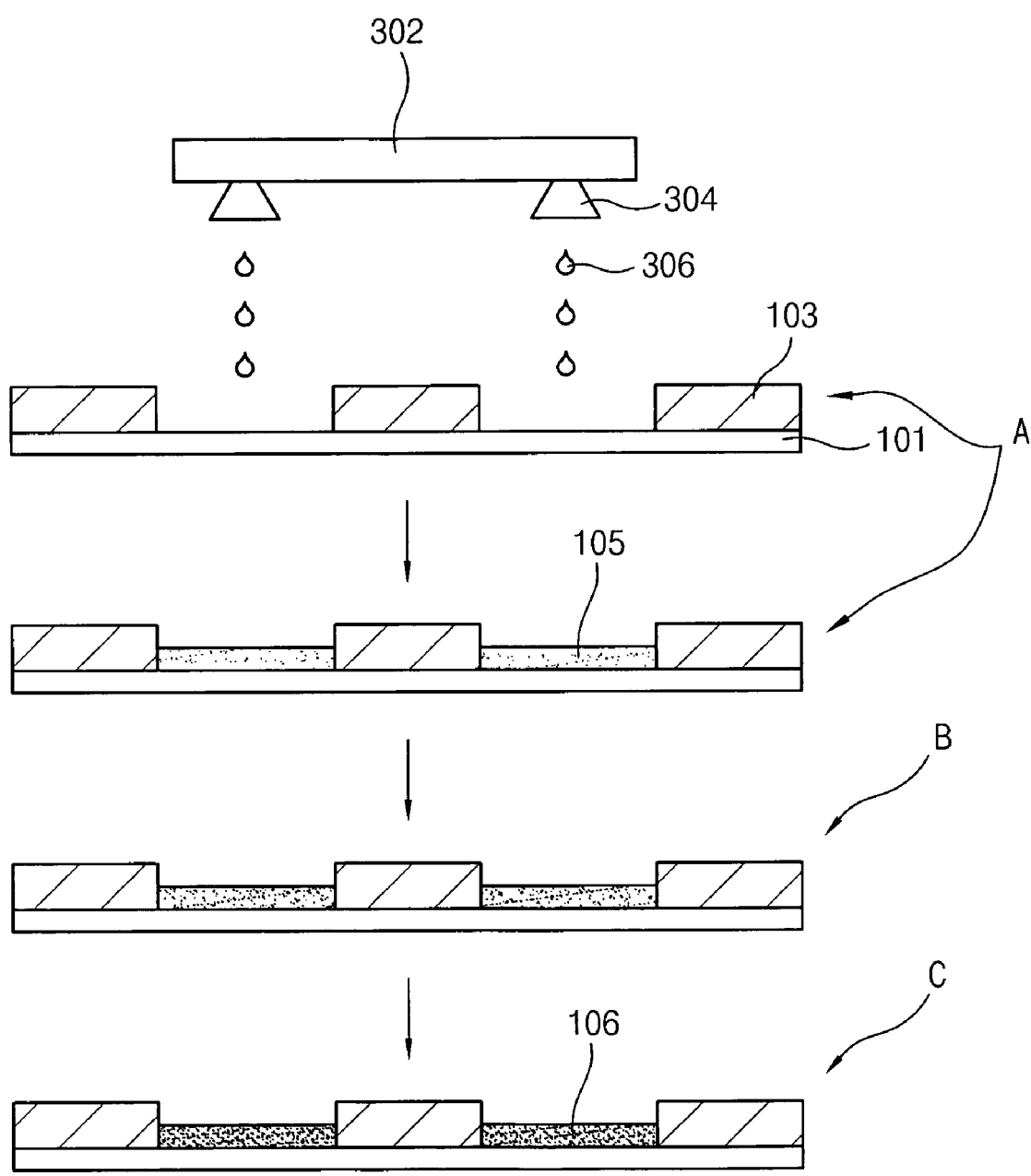
FIG. 4 is a cross-sectional view schematically illustrating forming a color pixel layer in accordance with an exemplary embodiment of the present invention.

FIGS. 3A to 3C are cross-sectional views illustrating a method of forming a black matrix pattern in accordance with an exemplary embodiment of the present invention. FIG. 4 is a cross-sectional view schematically illustrating a formation of a color pixel layer in accordance with an exemplary embodiment of the present invention.

Referring to FIGS. 3A to 3C, a method of forming a black matrix pattern includes forming a black matrix composition layer (I), exposing a black matrix composition layer (II) and developing a black matrix composition layer (III).

Referring to FIG. 3A, a positive typed photoresist material is sufficiently coated on a glass substrate 101 after cleaning the glass substrate 101 to form a photoresist layer on the glass substrate 101. The coated photoresist layer functions as a black matrix. The photoresist layer has a thickness of more than about four times of a thickness of the color pixel layer. For example, the photoresist layer 102 has a thickness of about 4 μm when the color pixel layer has a thickness of about 1 μm.

Referring to FIG. 3B, a photo mask 202 having a substantially same pattern as a desirable black matrix pattern is disposed over the photoresist layer 102. Then, a photolithography process is performed. Here, the photolithography process includes patterning the photoresist, exposing and developing.

Referring to FIG. 3C, a black matrix 103 and a pixel area 104 are formed on the glass substrate 101. The black matrix 103 has a structure of partition wall, and the black matrix 103 defines the pixel area 104.

Referring to FIG. 4, forming a color pixel layer 106 using an ink jet method is described hereinafter.

An ink composition 306 is injected into the pixel area through an ink-jetting nozzle 304 of an inkjet head 302 so as to form an ink composition layer 105 (step 'A'). The ink composition includes about 100 parts by weight of pigment dispersion, about 7 parts by weight to about 65 parts by weight of a thermosetting resin, about 0.015 part by weight to about 1.5 parts by weight of a thermal initiator, about 0.8 part by weight to about 15 parts by weight of an epoxy-based monomer, about 15 parts by weight to about 165 parts by weight of a solvent and about 0.015 part by weight to about 3 parts by weight of an additive. The thermosetting resin contains a hydroxyl group at a side chain of the thermosetting resin. The epoxy-based monomer contains fluorine. The ink composition for color filter is already described in detail and thus further description of the ink composition for color filter will be omitted hereinafter.

The ink composition is heated to have a temperature of about 140° C. to about 150° C. When the ink composition is heated to have temperature of more than about 140° C., the thermal initiator contained in the ink composition generates an acid (step 'B').

After step 'B' is completed, the ink composition is heated again to have a temperature of about 200° C. to about 210° C., and an acidic state is formed in the ink composition. When the ink composition reaches the temperature of about 200° C. to about 210° C., thermally cross-linking reaction starts between the hydroxyl group of the thermosetting resin and the epoxy-based monomer. Particularly, an epoxy group of the epoxy-based monomer is opened by an opening reaction, and then the opened epoxy group of the epoxy-based monomer is bonded to the hydroxyl group of the thermosetting resin (step 'C'). The thermally cross-linking reaction is represented by chemical equation (1):

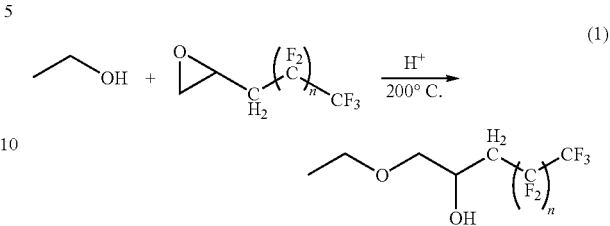

wherein 'n' denotes an integer of 1 to 20.

Through the above reaction, the hydroxyl group at the side chain of the thermosetting resin is cross-linked with at least one of the epoxy-based monomers.

When an ink composition layer is cured, the color pixel layer 106 including the cross-linked resin is formed on a substrate.

The color pixel layer 106 has great heat endurance and great chemical resistance through the cross-linking reaction.

The cross-linked resin may have a structure represented by formula of (8):

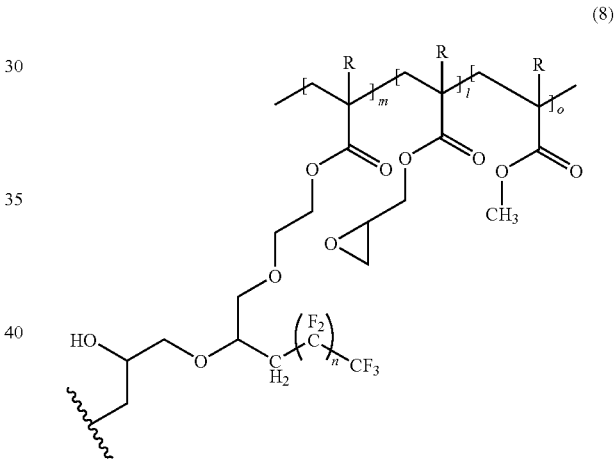

wherein 'R' denotes hydrogen or a methyl group, 'X' denotes hydrogen, an alkyl group, a nitro group or an alkoxy group, each of 'm', 'l' and 'o' denotes an integer of 0 to 1000 (the values 'm', 'n' and 'o' cannot be zero at the same time) and 'n' denotes an integer of 1 to 20.

Hereinafter, the exemplary embodiments of the present invention will be described in detail with reference to the following examples. The examples are given solely for the purpose of illustration and are not to be construed as limitations of the present invention, as many variations thereof are possible without departing from the spirit and scope of the invention.

Ink Composition for Color Filter

EXAMPLE 1

Into a reaction vessel, were added about 364 g of a pigment dispersion (RED) (commercially available as a trade name of CI254, manufactured by Ciba Specialty Chemicals Co., Swiss), about 100 g of a copolymer (weight average molecular weight: 15000) polymerized from monomers including glycidylmethacrylate, benzylmethacrylate, 2-hydroxyethylmethacrylate and methylmethacrylate of about 30:30:30:10 as a thermosetting resin, about 1 g of (2-cyclohexanonyl) cyclohexyl methylsulfonium trifluoromethanesulfonate as a thermal initiator, about 30 g of an epoxy-based monomer of formula (3) (n=10) as a cross-linkable monomer, about 300 g of dipropyleneglycol monomethylether acetate (DPMA) as a solvent, about 2.5 g of an antifoaming agent and about 2.5 g of an surface leveling agent. Then, thus obtained mixture was stirred at a speed of about 40 rpm for about 3 hours. Hence, about 800 g of a color filter composition was obtained.

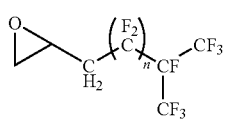

(3)

EXAMPLE 2

Into a reaction vessel, were added about 364 g of a pigment dispersion (RED) (commercially available as a trade name of CI254, manufactured by Ciba Specialty Chemicals Co., Swiss), about 100 g of a copolymer of formula (1) (m=5000; l=5000; o=5000) as a thermosetting resin, about 1 g of (2-cyclohexanonyl)cyclohexyl methylsulfonium trifluoromethanesulfonate as a thermal initiator, about 30 g of an epoxy-based monomer of formula (3) (n=10) as a cross-linkable monomer, about 300 g of dipropyleneglycol monomethylether acetate (DPMA) as a solvent, about 2.5 g of an antifoaming agent and about 2.5 g of an surface leveling agent. Then, thus obtained mixture was stirred at a speed of about 40 rpm for about 3 hours. Hence, about 800 g of a color filter composition was obtained.

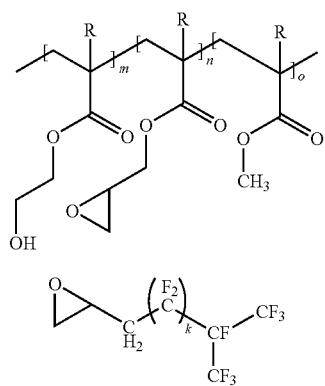

COMPARATIVE EXAMPLE 1

Into a reaction vessel, were added about 364 g of a pigment dispersion (RED) (commercially available as a trade name of CI254, manufactured by Ciba Specialty Chemicals Co., Swiss), about 100 g of a copolymer (weight average molecular weight: 15000) polymerized from monomers including glycidylmethacrylate, benzylmethacrylate, 2-hydroxyethylmethacrylate and methylmethacrylate of about 30:30:30:10 as a thermosetting resin, about 1 g of (2-cyclohexanonyl) cyclohexyl methylsulfonium trifluoromethanesulfonate as a thermal initiator, about 330 g of dipropyleneglycol monomethylether acetate (DPMA) as a solvent, about 2.5 g of an antifoaming agent and about 2.5 g of an surface leveling agent. Then, thus obtained mixture was stirred at a speed of about 40 rpm for about 3 hours. Hence, about 800 g of a color filter composition was obtained.

Color filter Substrate

EXAMPLE 3

The ink composition for a color filter prepared in Example 1 was jetted into a pixel area on a black matrix pattern prepared through an ink-jetting nozzle. The ink composition for the color filter was heated to be a temperature of about 140° C. and maintained at the temperature of about 140° C. for about fifteen minutes. Then, the ink composition for the color filter was heated again to be a temperature 200° C. and was cured for about thirty minutes to form a color pixel layer. Hence, the color filter substrate was completed.

EXAMPLE 4

The ink composition for a color filter prepared in Example 2 was jetted into a pixel area on a black matrix pattern that was through an ink-jetting nozzle. The ink composition for the color filter was heated to be a temperature of about 140° C. and maintained at the temperature of about 140° C. for about fifteen minutes. Then, the ink composition for the color filter was heated again to be a temperature of about 200° C. and was cured for about thirty minutes to form a color pixel layer. Hence, the color filter substrate was completed.

COMPARATIVE EXAMPLE 2

The ink composition prepared in Comparative Example 1 was jetted into a pixel area through an ink-jetting nozzle. The ink composition jetted into the pixel area was heated to have a temperature of higher than about 140° C. and for about fifteen minutes. Then, the ink composition was reheated to have a temperature of about 200° C. and maintained at the temperature of about 140° C. for about thirty minutes. Hence, a color pixel layer was formed and a color filter substrate was manufactured.

Experiment 1: Measurement of Contact Angle

After jetting the ink compositions prepared in Examples 1 and 2, and Comparative Example 1, respectively, on a black matrix composed of an organic polymer, contact angle of the ink composition for a color filter at a surface of the black matrix was measured. Measured contact angles are shown in Table 1.

TABLE 1

| Example | Contact angle (degree) |
| --- | --- |
| Example 1 | 67 |
| Example 2 | 69.5 |
| Comparative Example 1 | 14.5 |

As shown in Table 1, the ink composition according to the present invention had a large contact angle, whereas the ink composition of Comparative Example 1 that did not contain fluorine had a small contact angle. Therefore, the ink compositions of Examples 1 and 2 were not spread on a surface of the black matrix.

Experiment 2: Observation of Ink Wetting at an Ink-Jetting Nozzle

Before the ink compositions for color filters prepared in Example 2 and Comparative Example 1 were jetted through an ink-jetting nozzle, degrees of ink wetting of the ink compositions for the color filters prepared in Example 2 and Comparative Example 1 at an ink-jetting nozzle were observed, respectively.

Figure 5A:
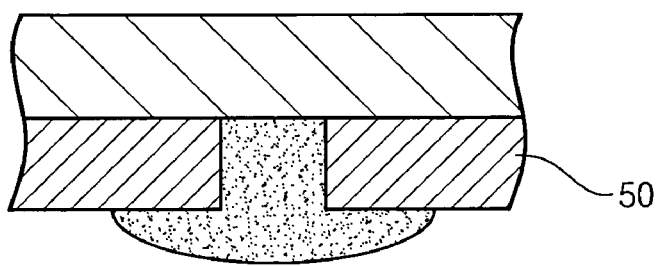
FIGS. 5A and 5B are cross-sectional views illustrating an ink-jetting nozzle with an ink composition before jetting the ink composition.
Figure 5B:
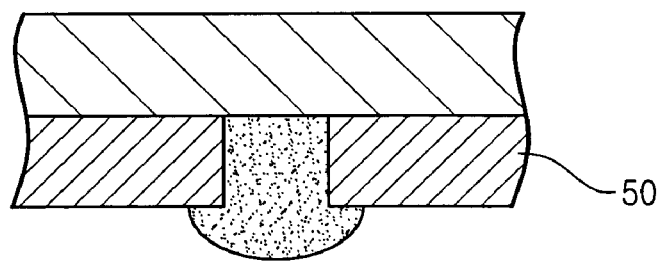

FIGS. 5A and 5B are cross-sectional views illustrating an ink-jetting nozzle with an ink composition before jetting the ink composition.

Referring to FIGS. 5A and 5B, the ink composition prepared in Comparative Example 1 was widely spread at a surface of the ink-jetting nozzle (A), whereas the ink composition prepared in Example 2 was slightly spread at a surface of the ink-jetting nozzle (B).

Experiment 3: Observation of Ink Spreading on an Organic Black Matrix

The ink compositions prepared in Example 2 were dropped onto an organic black matrix and a glass substrate, respectively. Also, the ink compositions prepared in Comparative Example 1 were dropped onto the organic black matrix and the glass substrate in substantially same amount as the ink composition prepared in Example 2, respectively. After dropping the ink compositions, degrees of ink spreading were observed.

Figure 6:
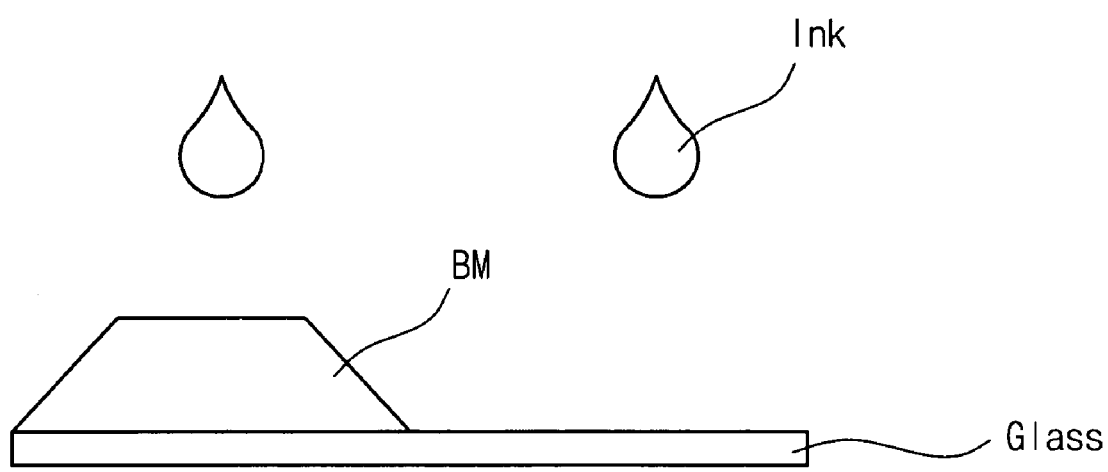
FIG. 6 is a cross-sectional view schematically illustrating jetting an ink composition onto a black matrix and a glass substrate.
Figure 7A:
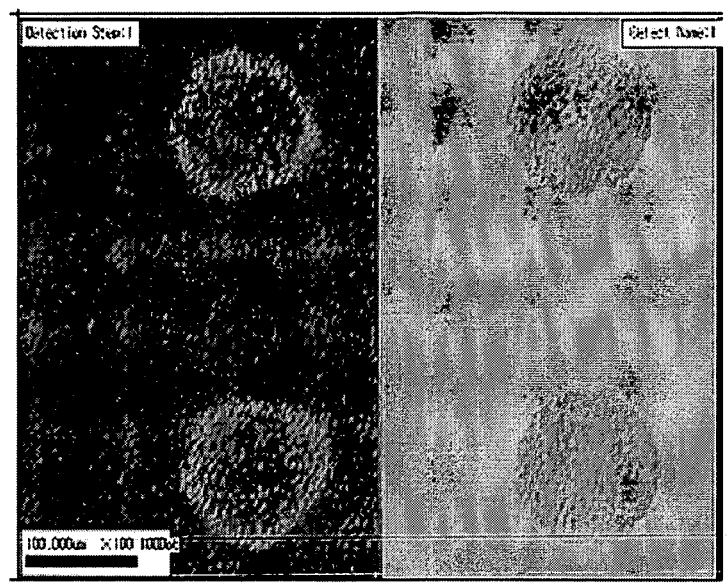
FIGS. 7A and 7B are photographs showing an ink spread on each of surfaces of black matrix and glass substrate.
Figure 7B:
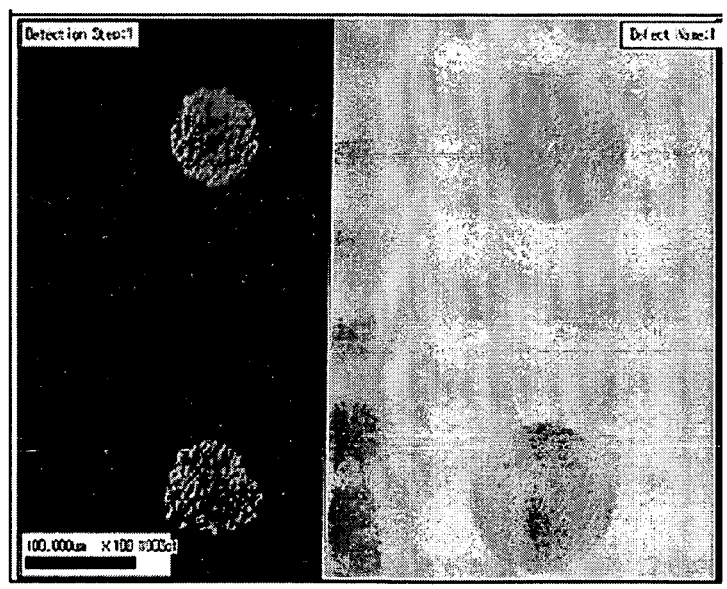

FIG. 6 is a cross-sectional view schematically illustrating dropping an ink composition onto a black matrix and a glass substrate, respectively. FIGS. 7A and 7B are photographs showing degrees of ink spreading on a black matrix and a glass substrate, respectively.

Referring to FIGS. 7A and 7B, degree of ink spreading of Example 1 (B) is remarkably lower than degree of ink spreading of Comparative Example 1 (A).

Particularly, lengths of ink composition spread on the black matrix and the glass substrate are shown in Table 2.

TABLE 2

| | Comparative Example 1 (μm) | Example 1 (μm) |
|---|---|---|
| Surface of the black matrix | 145 | 81 |
| Surface of the glass substrate | 145 | 140 |

Experiment 4: Observation of Straightness of Jetted Ink Composition

Each of ink compositions prepared in Example 2 and Compared Example 1 was subsequently dropped into each of pixel areas as an ink-jetting nozzle is moved, and then degree of straightness of a dropped ink composition was observed.

Figure 8:
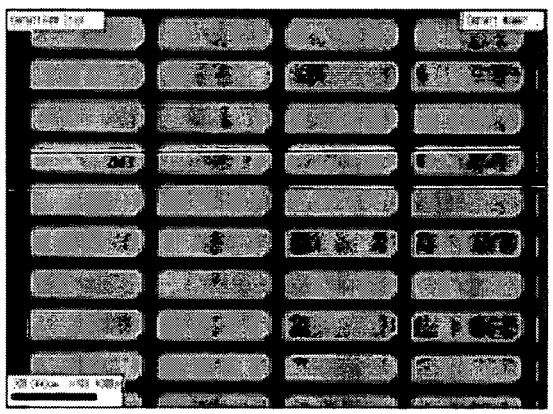
FIG. 8 is a photograph showing straightness of jetted ink compositions prepared in Comparative Examples 1 and 2.
Figure 8:
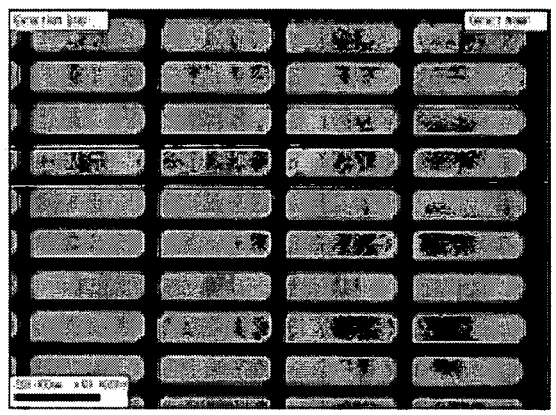

FIG. 8 is a photograph showing a straightness of dropped ink compositions prepared in Comparative Example 1 and Example 2.

'A' corresponds to Comparative Example 1, and 'B' corresponds to Example 2. The straightness of jetted ink composition prepared in Comparative Example 1 was low, whereas the straightness of jetted ink composition prepared in Example 2 was great.

Experiment 5: Test of Thermal Endurance and Chemical Resistance of a Color Filter Substrate A thermal endurance and a chemical resistance of the color filter substrate (Example 4 and Comparative Example 2) were estimated.

1. Estimation of the thermal endurance

The color filter substrate was maintained at a temperature of about 230° C. for about one hour.

In color filter substrate of Example 4, change of color property of the color filter substrate and shrinkage of the color filter substrate were not observed. However, in color filter substrate of Comparative Example 2, change of color property of the color filter substrate and shrinkage of the color filter substrate were observed.

2. Estimation of the Chemical Resistance

After ultrasonically treating (800 W, 40 KHz) the color filter substrate at a room temperature for about ten minutes using isopropyl alcohol, a generation of film loss of a color pixel layer of the color filter substrate was estimated. In the color filter substrate of Example 4, film loss was not generated. However, in the color filter substrate of Comparative Example 2, film loss was generated.

After ultrasonically treating (800 W, 40 KHz) the color filter substrate at a temperature of about 40° C. for about ten minutes using tetramethylammonium hydroxide (aqueous solution of 2.8 w %), a generation of film loss of a color pixel layer of the color filter substrate was estimated.

In the color filter substrate of Example 4, film loss was not generated. However, in the color filter substrate of Comparative Example 2, film loss was generated.

According to the above, the ink composition for the color filter is not easily wetted to the ink-jetting nozzle, so that straightness of ink jetting is improved, thereby improving accuracy of dropping the ink into the pixel area of the substrate. Therefore, the color filter substrate according to the present invention may uniformly express a color.

Further, the ink composition for color filter according to the present invention may not spread on the organic black matrix, so that a color-interference between the color pixels adjacent each other may be prevented. Therefore, the ink composition for the color filter may prevent deterioration of color property caused by an overlap of different colors.

In addition, the color pixel layer formed using the color filter composition may have a great thermal endurance and a great chemical resistance, thereby improving durability of the color filter substrate.

Having described the exemplary embodiments of the present invention, it is further noted that it is readily apparent to those of reasonable skill in the art that various modifications can be made herein without departing from the spirit and scope of the invention as defined by appended claims.

What is claimed is:

1. An ink composition for color filter comprising:
   about 100 parts by weight of a pigment dispersion;
   about 7 parts by weight to about 65 parts by weight of a thermosetting resin having hydroxyl group at a side chain of the thermosetting resin;
   about 0.015 part by weight to about 1.5 parts by weight of a thermal initiator;
   about 0.8 part by weight to about 15 parts by weight of an epoxy-based resin containing fluorine; and
   about 15 parts by weight to about 165 parts by weight of a solvent.

2. The ink composition of claim 1, further comprising about 0.015 part by weight to about 3 parts by weight of an additive.

3. The ink composition of claim 1, wherein the thermosetting resin comprises an acryl-based copolymer.

4. The ink composition of claim 3, wherein the thermosetting resin comprises at least one selected from the group consisting of copolymers of formulae (1) and (2):

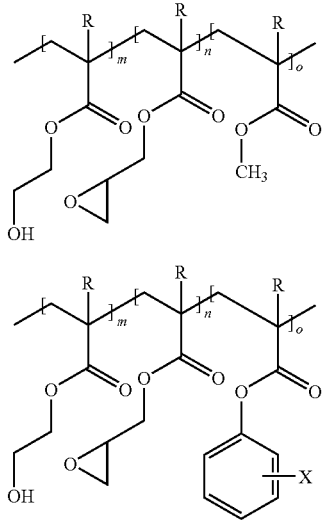

wherein 'R' denotes hydrogen or a methyl group, 'X' denotes hydrogen, an alkyl group, a nitro group or an alkoxy group, and 'm' denotes an integer of 1 to 1000, and each of 'o' and 'n' denotes an integer of 0 to 1000.

5. The ink composition of claim 3, wherein the thermosetting resin comprises a copolymer polymerized at random from monomers comprising at least one selected from the group consisting of glycidylmethacrylate, benzylmethacrylate, 2-hydroxyethylmethacrylate and methylmethacrylate.

6. The ink composition of claim 1, wherein the thermal initiator comprises at least one selected from the group consisting of (2-cyclohexanonyl)cyclohexyl methylsulfonium trifluoromethanesulfonate, (2-cyclohexanonyl)dimethylsulfonium trifluoromethanesulfonate, (2-cyclohexanonyl)2-norbornanyl methylsulfonium trifluoromethanesulfonate, triphenylsulfonium perfluorooctansulfonate, s-(2-naphthalenecarbonylmethyl)tetrahydrothiophenium p-toluenesulfonate, di-(4-t-butylbenzen)iodonium hexafluorophosphorate di-(4-t-butylbenzen)iodonium hexafluoroantimonate and di-(4-t-butylbenzen)iodonium nonafluorobuthanesulfonate.

7. The ink composition of claim 1, wherein the epoxy-based monomer having fluorine comprises at least one selected from the group consisting of compounds of formulae (3) and (4):

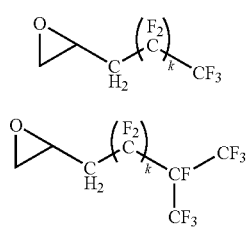

wherein 'k' denotes an integer of 1 to 20.

8. The ink composition of claim 1, wherein the solvent comprises at least one selected from the group consisting of propyleneglycol monomethylether acetate, ethylethoxy propionate, cyclohexanon and dipropyleneglycol ether acetate.

9. The ink composition of claim 2, wherein the additive comprises at least one selected from the group consisting of an anti-foaming agent and a surface leveling agent.

10. A method of manufacturing a color filter substrate comprising:
   forming a blocking layer on a substrate, the blocking layer blocking a light transmitted through the substrate and defining a pixel area;
   jetting an ink composition for the color filter into the pixel area, the ink composition for the color filter comprising:
   about 100 parts by weight of a pigment dispersion;
   about 7 parts by weight to about 65 parts by weight of a thermosetting resin having hydroxyl group at a side chain of the thermosetting resin;
   about 0.015 part by weight to about 1.5 parts by weight of a thermal initiator;
   about 0.8 part by weight to about 15 parts by weight of an epoxy-based resin containing fluorine; and
   about 15 parts by weight to about 165 parts by weight of a solvent;
   heating the ink composition to generate an acid from the thermal initiator; and
   reheating the ink composition to form a cross-linked resin from the thermosetting resin and the epoxy-based monomer.

11. The method of claim 10, wherein the thermosetting resin comprises at least one selected from the group consisting of copolymers of formulae (1) and (2):

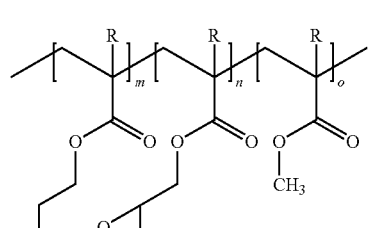

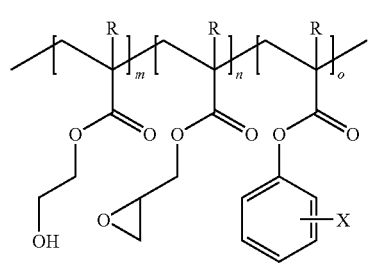

wherein 'R' denotes hydrogen or a methyl group, 'X' denotes hydrogen, an alkyl group, a nitro group or an alkoxy group, and 'm' denotes an integer of 1 to 1000, and each of 'o' and 'n' denotes an integer of 0 to 1000.

12. The method of claim 10, wherein the heating of the ink composition is performed at a temperature of about 140° C. to about 150° C.

13. The method of claim 10, wherein the reheating of the ink composition is performed at a temperature of about 200° C. to about 210° C.

14. The ink composition of claim 1, wherein the solvent is present in an amount of about 30 parts by weight to about 120 parts by weight.

* * * * *